Sept. 12, 1961 I. M. LEVY 2,999,955
TWO-SPEED TWO-FOUR POLE STATOR WINDING ARRANGEMENT
Filed Sept. 29, 1959 2 Sheets-Sheet 1
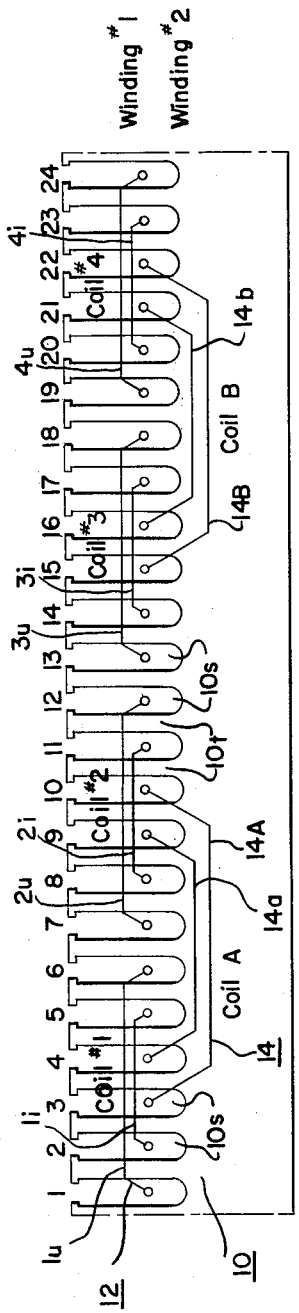
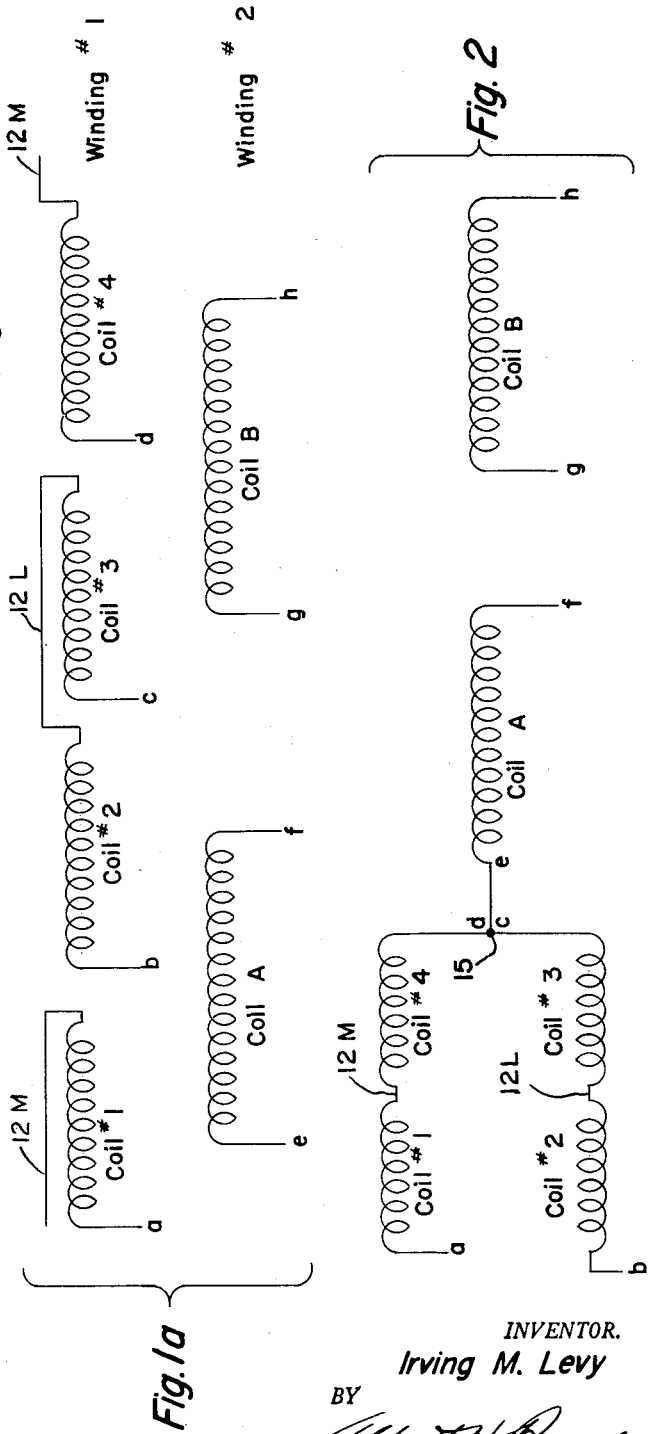
INVENTOR.
Irving M. Levy
BY
*Albert H. Reuther*
His Attorney Sept. 12, 1961              I. M. LEVY              2,999,955
TWO-SPEED TWO-FOUR POLE STATOR WINDING ARRANGEMENT
Filed Sept. 29, 1959              2 Sheets-Sheet 2

INVENTOR.
Irving M. Levy
BY
His Attorney

United States Patent Office 2,999,955
Patented Sept. 12, 1961

2,999,955
TWO-SPEED TWO-FOUR POLE STATOR
WINDING ARRANGEMENT
Irving M. Levy, Dayton, Ohio, assignor to General Motors Corporation, Detroit, Mich., a corporation of Delaware
Filed Sept. 29, 1959, Ser. No. 843,210
6 Claims. (Cl. 310—188)

This invention relates to dynamoelectric machines and particularly to a stator winding for a capacitor start motor.

An object of this invention is to provide a new and improved stator winding arrangement for a dynamoelectric machine.

Another object of this invention is to provide a stator winding arrangement for a two-four pole two-speed capacitor start motor having a slotted stator containing two windings, where the coils thereof need not be in shared slots and having a set of coils of one winding serving as a four pole main winding and a set of coils of a second winding serving as a consequent pole starting winding subject to opening of connection thereto by a switching device when switching speed is attained.

Another object of this invention is to provide a stator winding arrangement for a two-four pole two-speed capacitor start motor having a slotted stator containing two windings including a first winding having first, second, third and fourth coil groups of which coil groups two and three in series are arranged to be connected in series or in parallel with coil groups one and four in series and including a second winding having coil means A and B arranged to have one coil means thereof reversibly connected in series with the other and with the series-parallel connected coil groups of the first winding all adapted to operate as four pole main, two pole main and four pole phase windings with considerable savings in cost and quantity of conducting material for the windings having none of the coils in shared slots.

Still a further object of this invention is to provide in one embodiment a stator winding arrangement for a two-four pole two-speed capacitor start motor having a twenty-four-slot stator containing two windings including a first winding having a first coil spanning slots 1–6, a second coil spanning slots 7–12, and a third coil spanning slots 13–18, and a fourth coil spanning slots 19–24 of which coils two and three in series are arranged for series-parallel connection with coils one and four in series and including a second winding having a coil A spanning slots 3–10 as well as a coil B spanning slots 15–22 arranged to have one coil of the second winding reversibly connected to permit reversal of polarity thereof such that each coil of each winding includes concentric sectors the opposite sides of which fit into individual slots such that none of the coils need be in shared slots.

Another object of this invention is to provide a stator winding arrangement for a two-four pole two speed capacitor start motor having a slotted stator containing two windings including a first winding having first, second, third and fourth coils of which coils two and three in series are arranged for series-parallel connection with coils one and four in series such that polarity of coils two and three can be reversed for two pole operation, and including a second winding having coil means A and B arranged to have one coil means thereof reversibly connected in series with the other and at one end of coil means A to a common connection of the series-parallel connected first winding having line voltage supplied to a pair of leads of the first winding remote from the second winding for starting and four pole running when a phase shift means is provided in a circuit in series with series connection of coils A and B, this series circuit being arranged in parallel with coils two and three, and having two pole running operation with polarity of coil means B as well as that of coils two and three being reversed due to reconnection of leads such that coils one and four in series are in parallel with coils two and three in series while line voltage is supplied to one end each of the first and second windings, none of the coils and coil means requiring any shared slots between them.

Further objects and advantages of the present invention will be apparent from the following description, reference being had to the accompanying drawings wherein preferred embodiments of the present invention are clearly shown.

In the drawings:

FIGURE 1 is a developed view of a slotted stator and winding arrangement including coils fitted thereto in accordance with the present invention.

FIGURE 1a is a schematic representation of two windings having coils and overlapped in relation to each other in accordance with the present invention.

FIGURE 2 is a schematic representation of series-parallel connection of coils of the windings of FIGURES 1 and 1a and having only five leads provided from the stator in accordance with the present invention.

Figure 4:
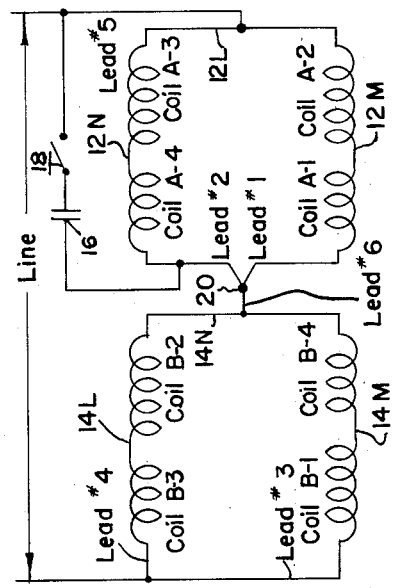
FIGURE 4 is a stator winding connection diagram for two pole running operation in accordance with the present invention.

FIGURE 1 is a developed view of a stator generally indicated by numeral 10 of magnetic material adapted to fit into a dynamoelectric machine housing which may be provided with end caps for journalling opposite ends of a shaft upon which a rotor is carried in a well-known manner. The stator includes a plurality of slots 10s separated from each other by radially extending teeth 10t. In one possible arrangement there can be slots 10s having openings identified by numerals 1 through 24 inclusive, as indicated in FIGURE 1, though the winding features of this invention are not limited to 24 slot stators. First and second windings indicated generally by numerals 12 and 14 respectively, are fitted into these twenty-four slots in predetermined overlapping relationship to each other. The first winding 12 includes multiple coils identified as coil number 1, coil number 2, coil number 3 and coil number 4 in the drawings. The second winding 14 includes coils or elements identified in the drawings as coil A and coil B. Each of the coils of the two windings includes one or more sectors having opposite ends or coil sides fitted into predetermined slots, none of which need be shared with any other coils or sides thereof.

The second winding 14, as indicated in FIGURE 1, includes coils A and B, each of which spans a predetermined number of slots. In one embodiment, coil A includes an outer concentric sector 14A having opposite ends or coil sides fitted into slots 3 and 10. Coil A further includes an inner concentric sector or segment 14a with opposite ends or coil sides fitted into slots 4 and 9. Similarly, coil B includes an outer sector or segment 14B having opposite ends or coil sides fitted into slots 15 and 22. Coil B includes an inner concentric sector or segment 14b having opposite ends or sides fitted into slots 16 and 21.

In this embodiment the first winding 12 includes coils 1, 2, 3 and 4 having two concentric sectors or segments spanning two slots, none of which are shared with other coil sides. Coil number 1 includes an inner concentric segment 1i having opposite sides or ends in slots 2 and 5. Coil 1 further includes an outer segment 1u having opposite ends or sides in slots 1 and 6. Coil number 2 of the first winding 12 includes an inner section or segment 2*i* having opposite sides fitted into slots 8 and 11. Coil number 2 also includes an outer section or segment 2*u* having opposite sides fitted into slots 7 and 12. Coil number 3 of the first winding 12 includes an inner concentric sector or segment 3*i* having opposite sides or ends fitted into slots 14 and 17. Coil number 3 also has an outer concentric or sector 3*u* having opposite sides or ends fitted into slots 13 and 18. Coil number 4 of the first winding 12 includes an inner concentric sector or segment 4*i* having opposite sides or ends fitted into slots 20 and 23. An outer segment 4*u* of coil number 4 has opposite sides or ends fitted into slots 19 and 24 as illustrated in FIGURE 1. It should be noted that opposite sides or ends of each of the sectors or segments of coils A and B of the second winding 14 are located adjacent to midportions of the coils 1, 2, 3 and 4 of the first winding 12. None of the ends or sides of any of the coils of either winding need share any slot with the sides or ends of any coil of any other winding.

FIGURE 1*a* illustrates schematically the layout of coils 1, 2, 3 and 4 as well as coils A and B of the first and second windings respectively, in overlapping relationship corresponding to that illustrated in the developed view of the stator and winding arrangement of FIGURE 1. As indicated in FIGURE 1*a*, coils of winding 12 are connected into two coil groups, each group consisting of two coils wound for opposite polarity connected in series. Coils 2 and 3 constitute one group and coils 1 and 4 constitute the other group.

FIGURE 2 is a schematic representation of permanent internal series-parallel connections for the coils of the first and second windings illustrated in FIGURES 1 and 1*a*. Coils 2 and 3 of the first winding 12 are in series due to connection by lead 12L and coils 1 and 4 of the first winding 12 are in series due to connection by a lead 12M. A common juncture 15 unites lead *d* from coil number 4, lead *c* of coil number 3 and lead *e* of coil A of the second winding 14. Thus, the juncture 15 and leads 12L and 12M establish permanent internal connections and only a total of five leads identified by letters *a*, *b*, *f*, *g* and *h* are required to be brought out from the stator winding arrangement. Coil B of the second winding 14 is adapted to be reversed in polarity from four pole start and run to obtain two pole run operation. However, it is noted that in FIGURE 3 lead *g* of coil B is connected to lead *f* of coil A, whereas in FIGURE 4 a reverse connection of coil B is established by connecting lead *h* of coil B of the second winding to a juncture 16, as indicated in FIGURE 4. For two pole operation, coil B must be reversed in polarity from that where winding 14 is used as a consequent pole four pole starting winding.

Figure 3:
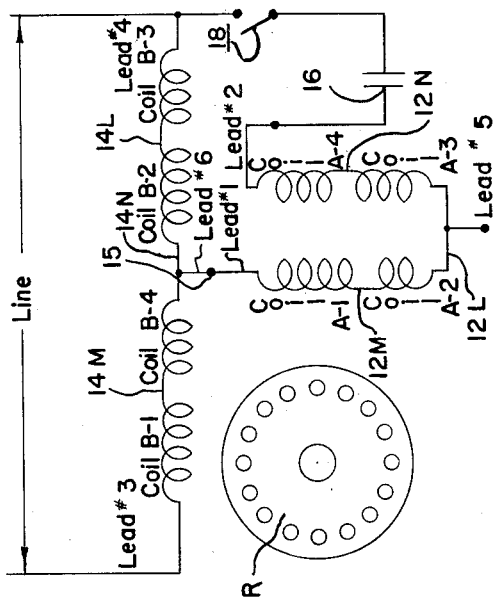
FIGURE 3 is a stator winding connection diagram for starting and four pole running operation in accordance with the present invention.

FIGURE 3 is a stator winding connection diagram to illustrate circuit connections described above and including connection of lead *h* of coil B to one side of a phase shifting means such as a capacitance 18 in series with a switching means generally indicated by numeral 20. This switching means per se does not form part of the present invention and any suitable device may be used for closing a series connection between juncture 15 and lead *b* such that coils A and B of the second winding 14 in series with the phase shift means or capacitance 18 are in parallel with a portion of the first winding 12, namely, coils number 2 and 3. A switching means such as disclosed in Patent 2,242,769, Werner, or a speed responsive device having structure and operation as set forth in Patent 2,747,854, Schnepf, issued May 29, 1956, and belonging to the assignee of the present invention, can be suitably used for the purpose of establishing this series-parallel relationship of the second winding 14 relative to a portion of the first winding 12. Line voltage from a suitable source is supplied relative to leads *a* and *b* of the first winding 12, as outlined in FIGURE 3.

In the circuit arrangement of FIGURE 3, the stator winding of the dynamoelectric machine is connected for four poles and utilizing coils A and B of the second winding 14 through which a phase shifted current flows due to presence of capacitance 18 to provide single phase motor starting. Upon attaining operating speed, the switching means 20 opens the circuit through the second winding 14 and the dynamoelectric machine having the stator winding when connected for four pole operation provides motor operating characteristics of a four pole angle phase motor.

For two pole running operation, switching means per se forming no part of this invention are provided such that the polarity of coil B of the second winding 14 is reversed and phase shift means such as capacitance 18 and switching means 20 are left to an open circuit by connecting lead *h* to lead *f* and connecting lead *g* to the line at point *j*. Lead *k* is disconnected from the line at *j*. The switching means also disconnects lead *b* from *j* and connects it to the other side of the line at *a*. This effectively parallels the series connections of coils 1—4 and 2—3, reversing the polarity of coils 2 and 3 in the process. For two pole operation, one pole is provided by coils 1, 2 and A and the second pole of opposite polarity by coils 3, 4 and B. Suitable switching which forms no part of the present invention can be provided for effecting change of connection of line voltage from a suitable source relative to leads *a* and *b* and/or *g* as illustrated in FIGURES 3 and 4. Also, a suitable selector switch connected in a suitable way and in accordance with knowledge of anyone skilled in the art, can be provided to facilitate instantaneous reversal of polarity of coil B of the second winding 14 to obtain two pole or four pole operation utilizing the stator winding arrangement in accordance with the present invention. The arrangement of first and second windings having coils as described fitted relative to twenty-four slots of a stator results in a considerable savings of materials such as copper used for the windings. The first winding serves as a four pole main winding and the second winding serves as a consequent pole starting winding on four pole connection.

While the embodiments of the present invention as herein disclosed constitute preferred forms, it is to be understood that other forms might be adopted.

What is claimed is as follows:

1. A dynamoelectric machine stator winding arrangement, comprising, a stator having a total of twenty-four slots, a first winding including a first coil having concentric segments spanning slots 1–6, 2–5, a second coil having concentric segments spanning slots 7–12, 8–11, a third coil having concentric segments spanning slots 13–18, 14–17 as well as a fourth coil having concentric segments spanning slots 19–24, 20–23 respectively, a second winding including a first coil having concentric segments spanning slots 3–10, 4–9 as well as a second coil having concentric segments spanning slots 15–22, 16–21 respectively, means connecting coils one and four in series with each other and joined at one end at least with coils two and three in series with each other, said coils of said second winding having a connection in series with each other such that one end is also joined where coils three and four of said first winding are joined, all of said coils of both first and second windings having only one coil side per slot such that one coil side of each segment fills one slot, each of said twenty-four slots having one coil side therein.

2. The winding arrangement of claim 1 wherein said second coil of said second winding is reconnectible for reverse polarity and said second and third coils of said first winding also can be reversed in polarity such that the dynamoelectric machine is adapted for operation as four pole and two pole running as well as consequent four pole starting.

3. A dynamoelectric machine stator winding circuit arrangement, comprising, a stator having a predetermined number of slots therein, a first winding having four coil elements with opposite sides in slots and spanning a predetermined number of slots, means connecting said first elements in pairs in series with each other, a second winding having a pair of coils in addition to elements of said first winding and both said windings having leads brought out from predetermined coils and elements such that only five leads are provided for external connection, a phase shifting means adapted to be connected in series with said second winding for four pole starting and eliminated for four pole running using only elements of said first winding in series and also eliminated along with reversal of connection of one coil of said second winding having both coils used in series with parallel connected pairs of series-connected elements of said first winding for two pole running operation, said coils of said second winding having opposite sides overlapping, in part, relative to pairs of said elements of said first winding all fitted into predetermined stator slots, each slot needing only one side of coils and elements per slot.

4. The circuit arrangement of claim 3 wherein said stator includes twenty-four slots and said second winding as well as said first winding are fitted therein such that sides of said elements of said first winding are centrally located relative to coils of said second winding, elements of said first winding spanning slots 1–6, 7–12, 13–18 and 19–24 respectively, and coils of said second winding spanning slots 3–10 and 15–22 respectively.

5. The circuit arrangement of claim 3 wherein said phase shifting means is a capacitor connected in series with said second winding for four pole starting operation using said elements of said first winding in series, said capacitor and said second winding lacking connection to line voltage applied relative to said four elements of said first winding in series for four pole running operation, one coil of said second winding being reconnected with reverse polarity without said capacitor in circuit and in series with the other coil of said second winding all in series with parallel-connected pairs of series-connected elements respectively such that line voltage is applied to one end each of said first and second windings for two pole running operation.

6. A dynamoelectric machine stator winding circuit arrangement, comprising, a stator having a total of twenty-four slots, a first winding including four elements spanning slots 1–6, 7–12, 13–18 as well as 19–24 respectively, means connecting first and fourth elements in series with each other and also second and third elements in series with each other, a second winding including only two elements spanning slots 3–10 and 15–22 respectively, one end of one element of said second winding having a permanent connection to a juncture also including one end of elements four and three to each other whereby only five leads are brought out from elements and coils having sides in slots 1, 7, 10, 15 and 22, a phase shifting means connected to the lead from one side of the element in slot 22, a switching means as well as phase shifting means adapted to be connected in series with both elements of said second winding in series all in parallel relative to coils three and two of said first winding having all four coils in series for four pole starting and running operation, and a connection for line voltage to be applied for two pole operation using both elements of said second winding in series with each other and with parallel-connected pairs of series-joined elements of said first winding, said elements of said second winding having opposite sides overlapping pairs of different series-connected elements of said first winding though only one side of each element is placed in each slot and none of the sides of any element shares a slot with any other side.

References Cited in the file of this patent

UNITED STATES PATENTS 2,671,879    Schwarz _____ Mar. 9, 1954

FOREIGN PATENTS 450,515    Canada _____ Aug. 17, 1948